Patented July 17, 1951

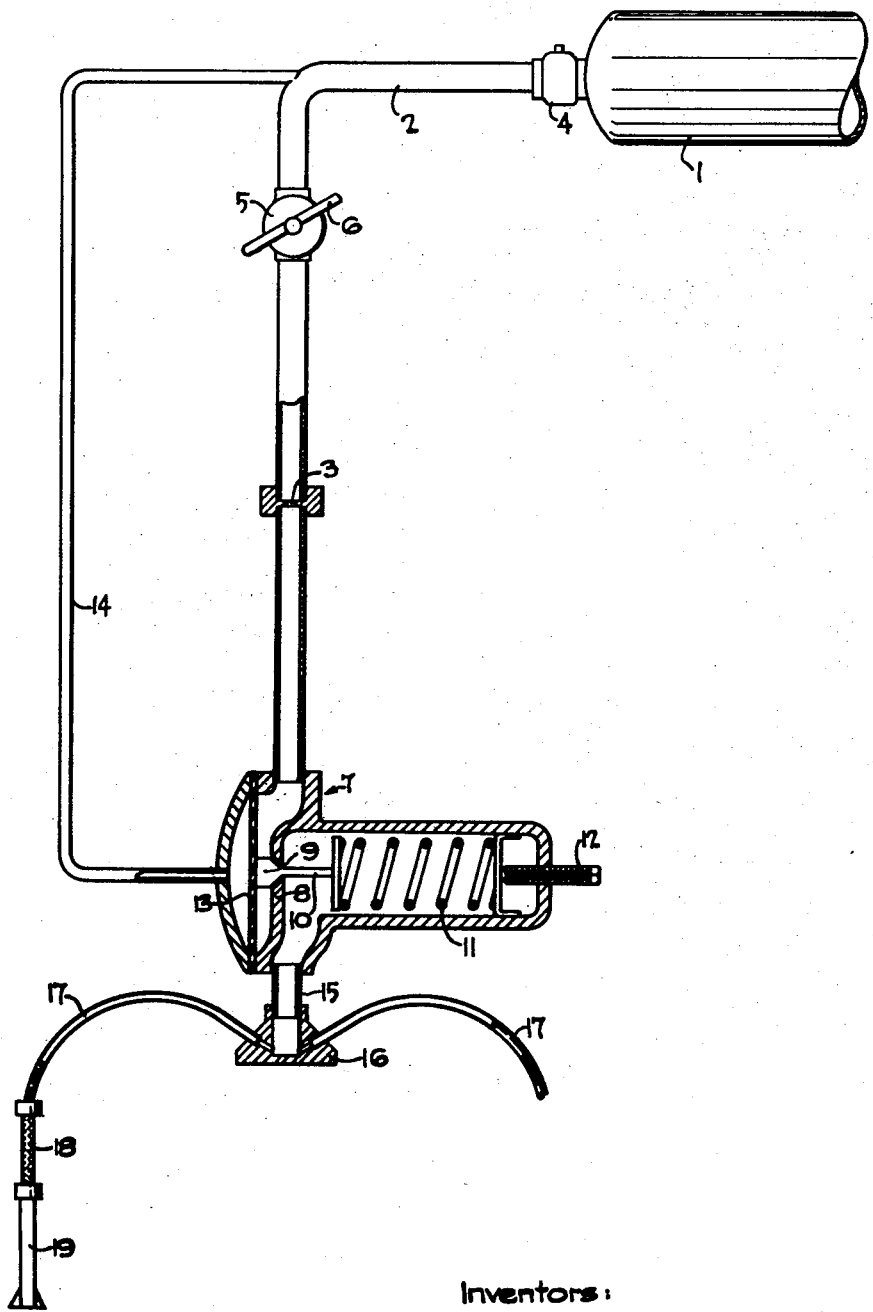

2,560,948

UNITED STATES PATENT OFFICE 2,560,948

DIFFERENTIAL PRESSURE METERING SYSTEM

Lester S. Hannibal and James R. Turner, Concord, Calif., assignors to Shell Development Company, San Francisco, Calif., a corporation of Delaware Application June 26, 1948, Serial No. 35,477

5 Claims. (Cl. 62—1)

This invention relates to a device and method for regulating the flow of fluid under pressure, and, more particularly, to the regulation of the flow of liquefied gas, such as liquid anhydrous ammonia, through a metering orifice.

Pressure regulators having metering orifices and pressure-responsive valves for regulating the flow of liquid are already known. Such known systems are, however, subject to certain drawbacks when applied to equipment intended for handling volatile liquids at or near their liquefaction pressures wherein intermittent flow is required. Thus, when the main, manually controlled shut-off valve (sometimes called the quick shut-off valve) is placed between the source of the pressure liquid and the metering unit, only the flow of liquid into the metering unit is stopped, and liquid within the unit will continue to expand, vaporize, and flow, or drain out for some time after the valve is closed; this is objectionable in many instances, for example, in agricultural applications wherein an excess amount of ammonia injected into the ground at one location may injure the plants. When the main control valve is placed between the metering unit and the ultimate outlet, e. g., the injectors in the case of an ammonia applicator, immediate shut-off is obtained; however, the flow regulating valve associated with the metering unit is, in this case, fully open, due to the equality of pressure on the upstream and downstream sides of the metering orifice, so that when the control valve is opened the initial flow of liquid is unduly large, resulting in an objectionable condition.

Moreover, in other systems intended to effect a dependable shut-off of the flow of liquid or effect metering from the start, the system is so arranged that a two phase mixture of vapor and liquid is charged to the metering orifice, leading to wide inaccuracies of measurement. This is true, for example, in systems wherein the pressure-regulating valve is located upstream from the metering orifice or equivalent metering constriction. This inaccuracy may be better understood by noting that when a highly volatile liquid, e. g., a liquefied gas such as liquid ammonia, is flowed near its liquefaction or equilibrium pressure through any constriction a portion of the liquid will flash to vapor. The amount of liquid flashed depends upon the pressure drop across the constriction and also upon the source pressure of the liquid (this pressure being determined by the temperature of the liquid when stored in containers). An upstream pressure regulating valve acts as a constriction and, hence, causes a mixture of vapor and liquid to enter the metering constriction. Metering of a vapor-liquid mixture in an orifice is inaccurate even when the quality of the stream (i. e., the ratio of vapor to liquid) is constant; it becomes highly inaccurate when the quality changes for the reasons above stated. Thus, even slight changes in the quality of the stream fed to the metering orifice create marked differences in the weight rate of flow through the orifice. Great changes in quality of the stream are encountered in many cases, such as the flow of liquid ammonia from a supply tank because the pressure in such tank often fluctuates as much as 50 to 75 lbs./sq. in. during one day.

It was found, however, that accurate metering can be attained in a metering orifice regardless of the vaporization occurring therein if the system is arranged so that substantially only liquid is fed to the metering orifice so long as the pressure drop across such orifice is maintained constant. (The term "metering orifice" is herein intended to include any constriction, whether fixed, replaceable or adjustable, used to meter the flow of the liquid.)

It is a principal object of this invention to provide an improved differential pressure regulating valve metering system and method for handling liquefied gas under or near its vapor pressure wherein substantially only liquid is supplied to the metering orifice, thereby obviating inaccuracies encountered in prior systems or in any system wherein a vapor-liquid mixture is supplied to the metering orifice.

It is another important object of this invention to provide an improved differential pressure regulating valve metering system and method suitable for handling liquefied gas under its vapor pressure, comprising a metering orifice, a differential pressure regulator for maintaining a predetermined pressure drop across the orifice, and a main control or shut-off valve located to permit flow of liquid to be positively controlled, and which will permit effective metering promptly upon opening the main control valve.

A specific object is to provide an improved differential pressure regulating valve metering system and method for metering the flow of ammonia in an agricultural applicator which will permit an accurately metered flow of ammonia at a predetermined rate through the system, which flow is substantially independent of the pressure of the source of ammonia supply, and which can be conveniently and dependably shut off to minimize the flow of ammonia after the main control valve is shut.

With these and other objects in view, which will become apparent from a reading of the following specification, the invention resides in the arrangement of conduits, valves, and pressure-responsive elements, in combination with the metering orifice, source of liquid under pressure, and outlet line, and in the combination of steps employed, as described therein.

Briefly, according to one important aspect of the invention, a volatile liquid at or near its vapor pressure is fed from a suitable source under pressure through a metering orifice (i. e., a fixed, replaceable or variable orifice plate or flow control valve) at a pressure sufficient to insure that substantially only liquid is supplied to the orifice, and the pressure drop across the metering orifice is maintained at a desired, predetermined value (either fixed or adjustable) so as to vaporize a portion of the liquid in flow through the orifice. The pressure drop is most advantageously held constant at said predetermined value by flowing the liquid and vapor mixture emerging from the metering orifice through a pressure regulator which will regulate the flow of this mixture in accordance with the difference between the pressures prevailing on the upstream and downstream sides of the metering orifice. By this arrangement it is possible to effect a very accurate control over the weight or mass rate of flow of fluid over a wide range of supply pressures (caused, for example, by changes in the temperature and/or in the extent to which the pressure containers are filled), and also over a wide range of pressure drops across the metering orifice. According to this phase of the invention, the location of the main shut-off valve is unimportant, and in certain installations, such as in the supply of liquid ammonia to irrigation water, where the flow is continuous for extended periods, the only shut-off valve may be that at the source, e. g., the cock on the pressure cylinder.

In accordance with another aspect of the invention, concerned with insuring dependable on-off control over the flow, the source of volatile liquid under pressure, e. g., a cylinder or tank containing liquid, anhydrous ammonia, is connected by a suitable supply conduit to the following elements in the sequence stated: (1) the high-pressure control line to a differential pressure regulating valve; (2) the main shut-off valve; (3) the metering orifice device; (4) a differential pressure regulating valve; and (5) the outlet. The objects of the invention according to this aspect may be attained even though elements 2 and 3 are interchanged, i. e., though the metering orifice is placed upstream from the main shut-off valve, and such an embodiment is considered as falling within the scope of the invention. Such a modified arrangement is not, however, preferred, and is to be avoided when it is desired to achieve accurate metering from the start after the system has been temporarily shut down; this preference arises from the circumstance that, where intermittent flow is desired, it is desired that liquid be prevented as far as practical from accumulating on the downstream side of the metering orifice in excess of the amount occurring there during normal operation. If the main shut-off valve is placed downstream from the metering orifice, liquid tends to fill the supply conduit between the orifice and the shut-off valve and this would result in an unduly large, unnatural flow when the shut-off valve is re-opened.

The differential pressure regulating valve may be of any type having one or more pressure responsive elements responsive to two different pressures and to open whenever the difference between these pressures falls below a predetermined value, and to close when said difference exceeds a predetermined value; the latter predetermined value may be the same as the former, although the invention is not limited to devices in which these values are exactly the same. The higher of the two pressures acting on the differential regulating valve is essentially that of the source of liquid, and is made effective by the high-pressure control line connected upstream from the orifice metering device and also, preferably, upstream from the main control valve, while the lower pressure is that prevailing on the downstream side of the metering orifice and upstream from the differential pressure regulating valve itself. This valve is, in the preferred embodiment, of the type which opens and closes progressively (as opposed to the type which has only an open position and a shut position), whereby the flow of fluid therethrough may be progressively varied by movement of the valve head or equivalent flow-control element thereof.

As a result of the arrangement described, the differential pressure regulating valve has a first side of its control element at all times acted on by the pressure in the supply conduit upstream from the main control valve and the metering orifice, this pressure being essentially that on the upstream side of the metering orifice when the main control valve is open. The second side of the control element is acted on by the pressure on the downstream side of the metering orifice, this pressure being less than the first named pressure by an amount equal to the pressure drop across the metering orifice (it being assumed that the pressure drop due to flow resistance in the supply conduit and the main shut-off valve is negligible). When this pressure drop exceeds a predetermined value for which the regulating valve is set the valve moves toward its closed position, thereby restricting the flow of fluid (which, in the case of a volatile liquid supplied to the metering orifice at a pressure near its vapor pressure, is a mixture of liquid and vapor) issuing from the metering orifice and thereby lowering the pressure drop. Conversely, when the pressure drop is too low the flow rate is correspondingly too low and the regulating valve opens wider to increase the pressure drop and, thus, the rate of flow. There being no flow obstruction upstream of the metering orifice, substantially only liquid can be fed to the orifice (assuming that the liquid under pressure is stored under suitable conditions) and accurate metering is achieved. When the main control valve is shut, the first side of the control element is, in the preferred arrangement, still acted on by the supply pressure; the pressure acting on the second side of the control element is reduced sharply immediately upon the closing of the main control valve, thereby greatly increasing the differential pressure on the two sides of the control element and causing the regulating valve to close. This regulating valve, being near to the outlet line, effectively shuts off the flow of fluid. When the main control valve is re-opened, pressure is re-applied to the second side of the control element, causing the regulating valve to open, and again permitting the flow of fluid; however, since the differential pressure regulating valve is initially in its closed position (instead of in its open position, as in prior art arrangements) the flow is metered from the start.

The invention will be better understood by reference to the accompanying drawing forming a part of this specification and illustrating diagrammatically the several elements used in one embodiment of the regulating valve system, it being understood that the invention may be embodied in other ways, and may employ other forms of containers, valves, metering orifices, flow regulators, etc. The illustrated embodiment combines both aspects of the invention into one system.

In the drawing, 1 represents a pressure cylinder containing liquid anhydrous ammonia, and connected to a main supply conduit 2 to a metering device comprising a disc 3 with a metering orifice. Such orifice metering devices are well known per se, and are operative to permit the passage of fluid therethrough at a rate dependent upon the difference in pressures on the upstream and downstream sides. A cock 4 may optionally be attached to the cylinder for permitting it to be moved while filled; when the cylinder has been installed this cock is opened and left open, playing no part in the operation of the system. A main control valve 5 is provided upstream of the metering orifice. This valve may be of any type, such as a gate or rotary valve, preferably such as to cause rapid change from fully open to fully closed position by rotation of its spindle through a limited arc. In the embodiment shown, the valve 5 is adapted to be manually operated by means of a lever 6 the handle of which may be within reach of the operator on the tractor or other vehicle used to carry the injection equipment.

A differential pressure regulating valve 7 is connected downstream from the metering orifice disc 3. It is provided with a valve seat 8 cooperating with a movable valve 9 on a spindle 10 normally urged toward open position by a coil spring 11, the tension on which can be adjusted by means of a screw 12. The spindle 10 is, further, connected to a flexible diaphragm 13 having its first side (to the left) connected via conduit 14 to the main conduit 2 upstream of the main control valve 5, and having its second side acted on by fluid downstream from the metering disc 3 and upstream of the regulating valve 7. Pressure on the first side of diaphragm tends to close the valve 9, and pressure on the second side tends to open the valve. The valve 9 is in balance when the force on the first side of the diaphragm equals the sum of the force of the spring 11 and the force acting on the second side.

Fluid is discharged from the regulating valve through an outlet line 15, which may be connected to a manifold or distributing head 16, where the ammonia is divided into a plurality of streams which are flowed via individual pipes 17 to hose connections 18 and injection blades 19 for injection into the ground as the supporting vehicle moves the blades with their discharge openings beneath the ground.

It will be evident that some of the ammonia will be vaporized after passage through the metering disc 3, and that the elements of the system downstream from the disc will be traversed by a mixture of liquid and vaporized ammonia. However, the accuracy of the metering will not be affected thereby, because substantially only liquid is supplied to the orifice disc. The rate of flow of ammonia may be varied by adjusting the screw 12 to bring the valve into equilibrium at any desired pressure difference, e. g., 40 lbs. per square inch. It is, further, possible to vary the flow by changing the orifice disc to provide one having an orifice of the required size. It will be understood that the expression "metering orifice" includes throttling valves and devices wherein the size of the orifice may be changed.

When the main valve 5 is closed, pressure on the second (right) side of the diaphragm is immediately reduced, causing the valve 9 to close and preventing further flow of ammonia through the outlet 15. When the valve 5 is opened pressure on the second side of the diaphragm is increased, causing the valve 9 to open.

As the cylinder 1 becomes depleted the pressure drops due to cooling caused by vaporization of ammonia required to fill the space vacated by the liquid withdrawn, but the differential pressure regulating valve 7 acts to maintain flow at substantially the same rate by maintaining a constant pressure drop across the metering orifice. Conversely, if the cylinder or tank pressure should increase due to a rise in the ambient temperature, the flow rate through the system would still remain substantially constant due to the constant pressure differential maintained across the orifice by the differential regulator as connected in this system.

We claim as our invention:

1. A differential pressure regulating valve metering system comprising a supply conduit adapted to be connected to a source of fluid under pressure; a differential pressure regulating valve in said supply conduit; an orifice metering device in said supply conduit between said source of fluid and said regulating valve; a main control valve in said supply conduit between said source of fluid and said orifice metering device; and an outlet conduit on the downstream side of said regulating valve; said differential pressure regulating valve having a differential pressure responsive element one side of which is connected to receive pressure fluid from said supply conduit between said source of fluid and said main regulating valve, and the other side of which is connected to receive pressure fluid from said supply conduit between said orifice metering device and said regulating valve itself and being provided further with resilient means aiding the pressure fluid acting on said other side, said pressure responsive element being connected to move the regulating valve toward its closed position in response to increased pressure fluid on the first named side, and toward its open position in response to increased pressure fluid on the said other side.

2. A differential pressure regulating valve metering system for metering ammonia while partially vaporizing said ammonia from liquid to vapor state, comprising, in combination, a pressure cylinder adapted to contain liquid ammonia under pressure, a main supply conduit connected to said cylinder and to a differential pressure regulating valve; an outlet conduit connected to said regulating valve; a flow obstruction provided with a metering orifice interposed in said supply conduit between said cylinder and the regulating valve; a main control valve in said supply conduit between said flow obstruction and said cylinder; pressure-responsive diaphragm means mounted within said regulating valve; first conduit means in communication between the supply conduit upstream of said flow obstruction and one side of said diaphragm means, second conduit means in communication between the supply conduit downstream of said flow obstruction and the other side of said diaphragm means, said differential pressure regulating valve being connected to respond to the difference between the pressure of the fluid in said supply conduit upstream from said main control valve and the pressure of the fluid in said supply conduit downstream from said flow obstruction and upstream from said regulating valve itself, and arranged to move toward its closed position when the difference between said pressures exceeds a predetermined value.

3. The differential pressure regulating valve metering system according to claim 2 wherein the differential pressure regulating valve is provided with resilient means biasing the valve in one direction, and with adjustable means for varying the biasing force of the resilient means, whereby said predetermined value of the difference between the pressures may be varied.

4. A fluid flow and differential pressure regulating system comprising a source of pressure fluid, a housing having an inlet and an outlet chamber, a valve interposed between said chambers, a conduit in communication between said fluid source and said inlet chamber, pressure reducing means in said conduit, a resilient diaphragm member in said housing exposed on one side to the pressure fluid in said inlet chamber, said diaphragm member being connected to said valve to open and close said valve, and a second conduit in communication between said fluid source and said housing, said second conduit opening to said housing on the other side of said resilient diaphragm member.

5. A fluid flow and differential pressure regulating system comprising a source of pressure fluid, a housing having an inlet and an outlet chamber, a valve interposed between said chambers, a conduit in communication between said fluid source and said inlet chamber, pressure reducing means in said conduit, a resilient diaphragm member in said housing exposed on one side to the pressure fluid in said inlet chamber, said diaphragm member being connected to said valve to open and close said valve, spring means mounted in said housing for aiding in moving said valve to its open position, and a second conduit in communication between said fluid source and said housing, said second conduit opening to said housing on the other side of said resilient diaphragm member.

LESTER S. HANNIBAL.
JAMES R. TURNER.

REFERENCES CITED

The following references are of record in the file of this patent:

UNITED STATES PATENTS

| Number | Name | Date |
|---|---|---|
| 1,588,699 | Brooks | June 15, 1926 |
| 1,725,374 | Rush | Aug. 20, 1929 |
| 1,904,475 | Kissing | Apr. 18, 1933 |
| 2,402,355 | Whaley | June 18, 1946 |